Oct. 9, 1951 M. J. DRAGANJAC 2,570,218
REMOTE-INDICATING FUEL GAUGE
Filed June 19, 1947

INVENTOR.
MICHAEL J. DRAGANJAC
BY
ATTORNEYS

Patented Oct. 9, 1951

2,570,218

UNITED STATES PATENT OFFICE 2,570,218

REMOTE-INDICATING FUEL GAUGE

Michael J. Draganjac, Allegheny County, Pa.

Application June 19, 1947, Serial No. 755,762

4 Claims. (Cl. 73—304)

(Granted under the act of March 3, 1883, as amended April 30, 1928; 370 O. G. 757)

The invention described herein may be manufactured and used by or for the Government for governmental purposes without payment to me of any royalty thereon.

This invention pertains to an instrument for indicating the level of a liquid within a closed container.

In the past instruments for indicating the level of a fluid in a closed tank has commonly depended upon devices having mechanically movable parts with or without sensitive radio tubes as parts of the instrument.

The principle of the instrument that forms the subject matter of the present invention is based upon the operation of a bridge circuit that uses transformers to convert minute unbalanced primary currents of microampere magnitude to milliampere values and the reading of these amplified currents upon commonly available alternating currnt rectifier type meters. The device comprises no moving parts other than those within the indicating meter and is not dependent upon the use of sevromechanisms, delicate radio tubes or the like. The operating principle of the device depends upon the recognized fact that the capacitive reactance of a condenser unit consisting of two or more parallel plates or cylindrical tubes as capacitor plates varies with the amount of surface area of the capacitor plates that is submerged in the liquid as a dielectric. It has been determined experimentally that optimum accuracy results where a regulated voltage supply is used. In the operation of the device the capacitive reactance of one condenser whose plates are immersed in the liquid is compared with that of a known fixed condenser and the difference, if any, is registered upon the indicating meter in terms of liquid level or quantity of fuel within the inclosed tank.

An object of the present invention is to provide a liquid level indicating instrument of improved type, accuracy and sensitivity wherein minute current differences are amplified by dependably rugged means for providing readings upon meters of commonly available types.

Another object is to provide a liquid device having no moving parts excepting those within an indicating meter.

A further object is to provide a liquid level indicating device comprising an electrical circuit wherein minute current values are amplified by the use of transformers for presentation.

With the above and other objects in view that will be apparent from the following description, an illustrative embodiment of the present invention is presented in the accompanying drawings wherein.

Figure 1:
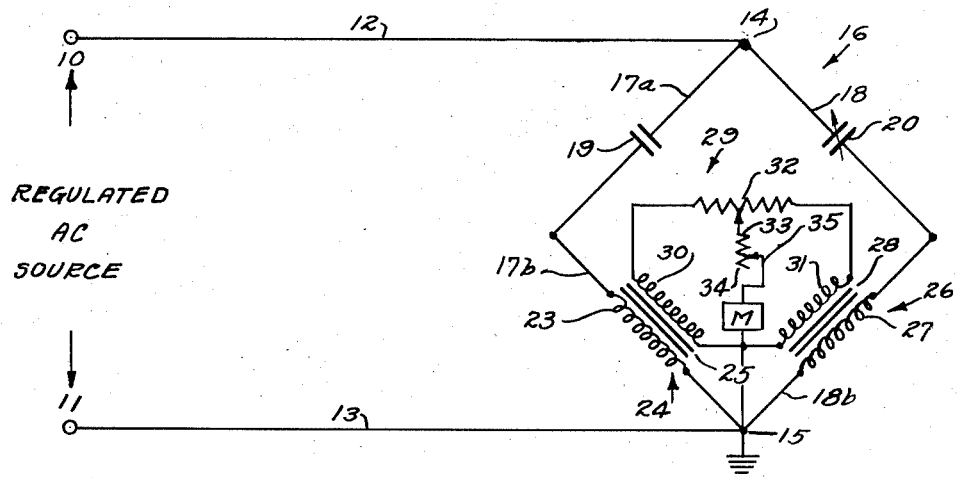
Fig. 1 is a schematic circuit of the device.
Figure 2:
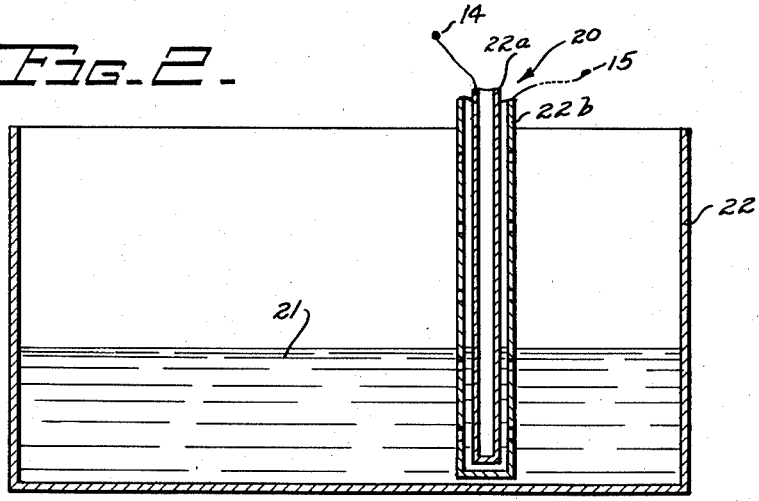
Fig. 2 is a sectional view taken through an immersed capacitor part of the device disposed within a liquid or fluid container.

In the circuit shown in Fig. 1, regulated alternating current is applied to terminals 10 and 11 that are connected by conductors 12 and 13 to bridge terminals 14 and 15, respectively throughout. The operative circuit comprises broadly a bridge circuit 16 and a measuring circuit 29. Capacitors 19 and 20 are positioned in adjacent branches of the bridge 16 and connected upon one side to the bridge terminal 14. The value of capacitor 19 is dependent upon the maximum or the minimum value of the capacitor 20. The capacitor 20 is that shown immersed in fluid 21 positioned within tank 22 as illustrated in Fig. 2 of the drawing. The capacitor device there shown comprises a closed inner cylindrical tube 22a that is connected to the bridge terminal 14 and that extends within and coaxially of an outer cylindrical tube 22b that is apertured as shown for the admission of the liquid 21 between the capacitor tubes 22a and 22b. It will be apparent that the tubes 22a and 22b may be replaced by a pair of capacitor plates if preferred, similarly immersed within the liquid 21 and preferably spaced uniformly from each other.

Transformers 24 and 26 have their primary windings 23 and 27 interposed between the capacitors 19 and 20 and ground at grounded terminal 15. The ground side of a standard alternating current rectifier type meter M is also applied to ground through the terminal 15 as also is one side of the secondary windings 30 and 31 of the transformers 24 and 26, respectively. 25 and 28 are the iron cores of transformers 24 and 26 respectively. The opposite sides of the transformer secondary windings 30 and 31 are connected through the variable resistor 32 that preferably is variably tapped by a movable contact 33. The movable resistor contact 33 is connected to a rheostat resistance 34 that preferably is variably tapped by a contact 35 that in turn is connected to the high or ungrounded side of the meter M.

The capacitor tubes 22a and 22b represented by the capacitor 20 in the circuit diagram shown in Fig. 1, extend from the minimum to the maximum level of the liquid 21, the height of which is to be measured within the tank 22. The capacitance between the tubes 22a and 22b is dependent upon the level of the liquid 21 and will appear in micro-microfarad units. The capacity between the capacitor tubes 22a and 22b increases as the tank 22 becomes increasingly filled with the liquid 21. With gasoline as the liquid 21 within the tank 22 the capacity value was substantially doubled between emptied and filled conditions of the tank 22. With other liquids this capacity value may be greater or less than that of the gasoline tested. This difference in capacity is amplified by the present invention sufficiently to cause a full scale reading upon the meter M.

The quantity of liquid 21 within the tank 22 may be indicated by either of two methods for the present instrument. In the first of these methods the capacity value of the capacitor 19 is chosen to be substantially equal to the capacity of the capacitor 20, which is that existing between the tubes 22a and 22b in Fig. 2 of the drawing, when the capacitor 20 is at maximum value with the tank 22 completely filled with the liquid 21. Assuming the transformers 24 and 26 to be of equal inductance value and interchangeable, then upon the application of an alternating current potential across the input terminals 10 and 11 a current will flow through capacitor 19 and the primary winding 23 of the transformer 24 which is equal to that going through capacitor 20 and the primary winding 27 of transformer 26 with the resistor contact 33 and the rheostat contact 35 initially balanced for no current flow through the meter M. The indicating hand of the meter M is then at an extreme position, since substantially no current passes through the meter M. For further calibration the potentiometer contact 33 is moved along the variable resistor 32 until the meter M has minimum current flow through it to balance out the inequality. In calibrating the scale on the meter M this extreme position of the meter hand is taken as the full reading for the liquid 21 within the tank 22.

As the quantity of the liquid 21 within the tank 22 diminishes, the capacitance of the capacitor 20 decreases, since liquid is withdrawn from between the capacitor tubes 22a and 22b until the tank 22 is emptied of the liquid 21. At that time, the hand upon the meter M will have reached its other extreme position, which is then taken as a minimum or empty reading for the meter scale. As the capacity of the capacitor 20 diminishes, the current flow through it and through the primary and secondary windings of the transformer 26 decreases, thereby increasing the difference in the current flow following that path of the bridge 16 and the current flow following the path wherein the capacitor 19 and the primary winding of the transformer 24 are in series. This difference in current flow increases with a decrease in the quantity of the liquid 21 contained within the tank 22 and hence the reading upon the meter M will be at minimum.

Since the current through capacitor 19 and the primary and secondary windings of transformer 24 remains constant, the difference between the two secondary currents of the transformers 24 and 26 will flow through the rheostat resistance 34 and the meter M. The amount of resistance introduced by the rheostat resistance 34 is adjusted by its tap 35 so that the meter will have full scale deflection current reading at the empty or zero end of the scale or the lowest capacity value of the capacitor 20. The divisions between the minimum or empty tank position and maximum or full tank position upon the scale of the meter M may be calibrated by measuring the quantity or level of the liquid 21 within the tank 22 and the corresponding value of capacitor 20 and may be substituted in the circuit for calibration purposes.

The second method for determining the quantity or level of the liquid or fluid 21 within the tank 22 differs from the first method in that it begins with the tank 22 empty, whereas the first method began with the tank 22 full. In the second method the value of the capacitor 19 is chosen to be equal to that of the capacitor 20 when the tank 22 is empty so that a balanced condition exists between the bridge circuit 16 and the measuring circuit 29, whereas the balance between these two circuits was made with the tank 22 full in the first method. As a quantity of the fluid 21 within the tank 22 is increased the capacity of the capacitor 20 increases and consequently the current passing through the capacitor 20 and the primary winding 27 of the transformer 26 is increased while the current passing through the capacitor 19 and the primary winding 23 of the transformer 24 remains constant since the terminals 10 and 11 are supplied from a regulated alternating current source. The increase or unbalance of this current is inductively applied to the measuring circuit 29 and hence flows through the meter M. The maximum value of the capacitor 20 causes a maximum unbalance in the current applied to the capacitors 19 and 20 and to the transformer primary windings 23 and 27. The rheostat tap 35 is then adjusted upon the rheostat resistor 34 so that the rheostat provides a maximum or full tank reading upon the meter M when the maximum unbalanced current is flowing. The resistor 32 is used as in the first method to select the balance for a minimum meter current position with equal values for the capacitors 19 and 20.

The transformers 24 and 26 used will have a ratio that is dependent upon the amount of current flow in the primary or bridge circuit 16. When the value of the capacitor 19 and the capacitor 20 is 1000 micro-microfarads or less with an applied voltage of 100 volts alternating current or less, the current at the meter M will be small, as in microamperes, so that the transformer ratio will be a step down ratio by having the primary turns greater in number than the secondary turns of wire, giving an increased current which can be measured upon standard commercial meters. The instrument that is disclosed herein has the advantages of light weight as compared with others now in use and comprises parts that have the advantages of not wearing out or burning out easily since they operate on low currents and low voltages. The capacitors 19 and 20 bear the major potential or voltage drop and are available commercially in the desired voltage range. The meter M may be selected sufficiently damped to give constant steady indications.

An illustrative experimental model that operated satisfactorily was constructed with the transformers 24 and 26 of a Navy type designated as 352-7214 which are equivalent to the United Transformer Company transformer type A-12. Each of these transformers weighs five ounces and the dimensions were 2¼ inches long and 1½ inches in the other two dimensions, thereby conserving both weight and space in aircraft installations. The meter M used was a Weston model 301, a voltage alternating current rectifier type rated at 2000 ohms per volt. The values of the rheostat 34 and the variable resistor 32 were of 100,000 ohms and 1500 ohms resistance respectively. The condensers 19 and 20 that were used for test purposes were General Radio precision variable condensers. In the tests conducted, a VR-75 regulator tube was used to maintain the voltage across the contacts 10 and 11 substantially constant at 70 volts alternating current. The power source was 115 volts alternating current.

The device and circuit that is disclosed herein is adapted for multiple applications or installations such as in the measuring of fuel levels in airplane gas tanks. The values of the capacitor 20 at present range between 100 and 1000 micro-microfarads which would necessitate equivalent values for the capacitor 19 if the ratios of the transformers 24 and 26 were made the same. If preferred, the capacitor 20 may contain a tank unit of the designated micro-microfarads plus a coaxial cable capacity. This is not a necessity since a standard value of capacitor 19 can be selected and a multiple tap transformer used for the transformer 24 which can match the current of the transformer 26 for the balanced condition. In other words, the transformer may be used for impedance matching purposes.

It is to be understood that the circuit and its application to the measurement of the fuel level in an inclosed gasoline tank that have been shown and described herein have been submitted for the purposes of illustrating and describing a satisfactorily operating embodiment of the present invention and that modifications and substitutions may be made therein capable of providing comparable results without departing from the spirit and scope of the present invention.

The invention claimed is:

1. A bridge circuit having two parallel branches, each branch including a condenser equaling the other condenser in capacity and a transformer primary winding connected in series, a closed secondary circuit including the secondary windings of said transformers and a resistance connected in series, said secondary windings being poled so that the voltages add, a slider on said resistance, a rheostat connected to said slider, a milliammeter of the rectifier type connected between said rheostat and a point between said secondary windings, said slider and rheostat serving to control the null position of the milliammeter and means for applying alternating voltage across said branches.

2. A bridge circuit grounded at one end thereof said bridge being supplied by a constant voltage alternating current, a condenser comprising a pair of tubular parallel surface members arranged in one branch of said bridge circuit, and an electrically matching condenser inserted in the other branch, said condensers having equal capacitances at one of the limit conditions which it is desired to measure, matching primary windings of transformers connected in series in the branches of said bridge circuit, a ground for said bridge circuit between said primary windings, a secondary circuit including matching secondaries of the said transformer primaries connected in series aiding the secondary circuit, an iron core connecting inductively each primary and secondary, a resistor connected in series in said secondary circuit between said secondaries, a slider operatively connected to said resistor, a rheostat connected in series to said slider, a milliammeter of the rectifier type connected to said rheostat and to ground, an adjustable tap on said rheostat for the milliammeter connection and means for applying an alternating voltage across said circuit.

3. A bridge circuit, a source of constant voltage alternating current supplying said bridge circuit, a constant capacitance reference condenser in one branch of said bridge, a variable capacitance condenser in another arm of the bridge, the capacitance being governed by the amount of dielectric liquid in said variable capacitance condenser, the two capacitances being equal at one of the limit conditions which it is desired to measure, a closed secondary circuit inductively coupled with said bridge circuit, a pair of transformers shared by the bridge and the secondary circuit, the primaries being connected in series in the bridge and grounded at their junction and the transformer secondary windings being connected in series aiding in the secondary circuit, a voltage divider in said secondary circuit adapted to balance the arms of the bridge, a variable resistance winding connected in series to said voltage divider contacted by a variably positionable tap, a meter connected in series between said tap and to a common ground with said transformer secondary windings whereby the range of current applied to the meter may be adjusted by the movement of the resistor variable tap, the voltage divider and resistor variable tap and winding together constituting a means for protecting the meter against destructive current surge when the maximum current is directed through the constant capacitance condenser and the minimum current through the variable capacitance condenser, and means for applying an alternating voltage across said circuit.

4. A bridge circuit which is grounded at one end, a source of regulated current for said bridge, a perforated tubular condenser in one branch of the bridge, said condenser having a capacitance variable in direct proportion to the level of liquid dielectric between the plates of said condenser, a reference condenser in a corresponding branch of said bridge, said second condenser equaling the first condenser in capacitance under a limit condition which it is desired to measure, the primaries of matched transformers in the remaining branches of the bridge, a closed secondary circuit grounded as to one of its ends and inductively coupled with said bridge circuit including the secondaries of said matched transformers in series aiding, resistor means for approximately balancing the output of said secondaries, an adjustable resistance connected to the resistor means to balance the branches of the bridge, a first variable position tap connecting said resistance to said resistor means, a second variable tap contacting said adjustable resistance, a milliammeter of the rectifier type in series with said resistance connected to said second variably positioned tap, and to a ground in common with said secondary circuit, said resistance being connected to the resistor balancing means and being adapted to adjust the unbalanced current by the position of said second tap to swing the needle of the milliammeter the full length of the milliammeter scale when the unbalanced current is indicating that the plates of the tubular condenser are fully covered with liquid dielectric, and means for applying an alternating voltage across said circuit.

MICHAEL J. DRAGANJAC.

REFERENCES CITED

The following references are of record in the file of this patent:

UNITED STATES PATENTS

| Number | Name | Date |
|---|---|---|
| 2,106,556 | Peterson | Jan. 25, 1938 |
| 2,300,562 | Freystedt | Nov. 3, 1942 |
| 2,375,084 | Coroniti et al. | May 1, 1945 |